US006043816A

United States Patent [19]
Williams et al.

[11] Patent Number: 6,043,816
[45] Date of Patent: Mar. 28, 2000

[54] USER INTERFACE MECHANISM FOR MAINTANING QUICK ACCESS TO IMPORTANT INFORMATION IN A WINDOWS-BASED COMPUTER ENVIRONMENT

[75] Inventors: Evelyn L. Williams, Longmont; Mark S. Anspach, Fort Collins; Jayson M. Webb, Boulder; Shane D. Meyer, Windsor, all of Colo.

[73] Assignee: Hewlett-Packard Company, Palo Alto, Calif.

[21] Appl. No.: 09/087,583

[22] Filed: May 29, 1998

[51] Int. Cl.[7] ........................................ G06F 3/14
[52] U.S. Cl. .................................. 345/340; 345/357
[58] Field of Search .................... 345/340, 339, 345/341, 343, 347, 348, 349, 350, 351, 352, 356, 357

[56]              References Cited

U.S. PATENT DOCUMENTS

| 5,305,435 | 4/1994 | Bronson ................................. 345/351 |
| 5,392,387 | 2/1995 | Fitzpatrick et al. .................... 345/350 |
| 5,416,895 | 5/1995 | Anderson et al. ...................... 707/503 |
| 5,500,929 | 3/1996 | Dickinson .............................. 345/356 |
| 5,542,040 | 7/1996 | Chang et al. .......................... 345/326 |
| 5,559,946 | 9/1996 | Porter .................................... 345/349 |
| 5,640,498 | 6/1997 | Chew .................................... 345/433 |
| 5,668,964 | 9/1997 | Helsel et al. .......................... 345/350 |
| 5,714,971 | 2/1998 | Shalit et al. .......................... 345/353 |
| 5,745,718 | 4/1998 | Cline et al. ........................... 345/350 |
| 5,923,328 | 7/1999 | Griesmer ............................... 345/357 |

Primary Examiner—Crescelle N. dela Torre

[57] ABSTRACT

A user interface mechanism of a single window in a windows-based computer environment, called a navigation tab, allows a user of the window to preserve and then to quickly re-access various locations within the window at some future time if the locations have been designated "keep accessible" locations. When the user navigates to a new location within the same application or a new application, a label of the navigation tab changes to show the new location. Until the user or application designates a location "keep accessible," the number of navigation tabs of the windows does not increase and the label of the existing navigation tab is replaced. If a location is designated as one to which the user wishes to return (i.e. "keep accessible"), a visual cue is presented in the label of the navigation tab to indicate that it is to be kept accessible. When the user navigates from this "keep accessible" location to a new location, a new replaceable navigation tab for the new location will appear within the window. Any number of navigation tabs may be used within the window.

80 Claims, 15 Drawing Sheets

USER INTERFACE MECHANISM FOR MAINTANING QUICK ACCESS TO IMPORTANT INFORMATION IN A WINDOWS-BASED COMPUTER ENVIRONMENT

CROSS REFERENCES TO RELATED APPLICATIONS

The subject matter of the present application is related to copending U.S. application, Ser. No. 09/087,066, titled "A User Interface Mechanism for Manipulating Content in Computer Management Applications", Docket No. 10980424-1, filed May 29 1998, and copending U.S. application, Ser. No. 09/086,635, titled "A Method and System to Provide Functionality Access Based on User Approach to Network and System Management Tasks", Docket No. 10980425-1, filed May 29, 1998, both of which are assigned to the assignee hereof and are herein incorporated by reference.

FIELD OF THE INVENTION

The present invention relates generally to a windows-based computer environment, and more particularly to a user interface mechanism for maintaining quick access to important information in windows-based computer environments, such as network and systems applications.

BACKGROUND OF THE INVENTION

Computers today are being used to accomplish increasingly complex jobs, e.g. network, systems and service management, air traffic control, and manufacturing control. In order to accomplish these types of complex jobs, it is very common for users to need access to different types of information that may be located at different logical locations within the application's information space. It is also common for the users doing these complex jobs to need to quickly switch back and forth between the different information sets. When moving between information sets, the user does not want to lose access to context that accompanies the information (i.e., parameter settings, cursor settings, functionality available from menus, toolbars). The different sets of information or locations can be presented in separate windows or the new information or locations can overlay the existing information in the same window.

If the different sets of information or locations are presented in separate windows, there is typically not sufficient space to view all windows simultaneously. To deal with this problem, users can either layer the windows across their display or they can reduce some of the open windows to icons. When the user switches back and forth between the windows that contain the needed information, he or she is frequently required to perform a number of window manipulation operations in order to make available the window with the desired information and functionality (e.g., reducing other windows to icons, moving windows aside to be able to top others). In addition to requiring user effort for window manipulation, users will have difficulty in maintaining access to the working status of operations going on in the various windows. When windows are reduced to icons, typically the only information provided on the icon is the name of the application. When windows are layered, the status information has a good chance of being hidden.

Alternatively, if the different sets of information or locations are presented in the same window, users will be required to do a great deal of application navigation to go back and forth between them. For example, the user may be required to open menus and select menu items to go to each set of information or users many need to expand tree list items and scroll across different portions of the list to access new information. Regardless of which approach is taken, separate windows or information within the same window, a number of user actions and significant time may be required for the user to move back and forth between information sets or locations. This effort or time may be unacceptable if the user needs to accomplish a time critical job. Computer users doing complex jobs therefore need a mechanism for quickly moving back and forth between sets of information and application locations.

In addition to the above needs, users doing complex jobs need support to be able to move between tasks without loosing data. Users doing complex jobs are frequently interrupted. After beginning a routine task, they may be called upon to handle an urgent condition that can have negative consequences if not handled immediately. The effort that the user has put into the routine task up to the point of the interruption may be compromised when the user tries to get the interface for this initial task out of the way in order to handle the more urgent need. A mechanism is needed that will allow the user to suspend the initial task, hide the GUI for that task and return to it once the more urgent task is complete. Furthermore, if users are performing tasks that require a large amount of time for system processing, they need to allow the system to continue to work on a task while they proceed to other work.

SUMMARY OF THE INVENTION

It is therefore an object of the present invention for a user of a windows-based environment to be able to move easily and readily between sets of information and application locations within the window.

It is an object of the present invention to minimize the number of user actions that are required to access application locations or sets of information.

It is another object of the present invention to minimize the number of open windows that are required to present application locations or sets of information to the user.

It is yet another object of the present invention for the user to be able to move between tasks and to return to tasks as required without loosing data.

It is still another object of the present invention to provide status information to the user about applications that are not currently visible.

Therefore, according to the present invention, a user interface mechanism of a single window in a windows-based computer environment, called a navigation tab, allows a user of the window to preserve and then to quickly re-access various locations within the window at some future time if the locations have been designated "keep accessible" locations. The user interface of the window has several components, including: a scoping pane, a content pane, and one or more navigation tabs in the content pane. Each navigation tab has a label that indicates a location within the application of that navigation tab; the label of an active navigation tab (usually the navigation tab on top) reflects the current location within the window that is presented in the content pane. When the user navigates to a second location from a first location within the window, the label of the active navigation tab changes to reflect the second location unless the first location has been designated a "keep accessible" location by either the user or by an application within the window. If the first location has been designated "keep accessible", then when the user navigates from the first location to the second location, a new navigation tab having a label that reflects the second location appears in the content pane of the user interface. The content pane will then have at least two navigation tabs: one for the first location and one for the second location. Since the first location has been marked "keep accessible," the user may easily and readily navigate back to the first location at any time simply by selecting the navigation tab of the first location.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention utilizes a graphical user interface (GUI) mechanism, called a navigation tab, to preserve and re-access different locations within a single window or logical application space. The locations may be within a single application or may be locations across applications. The location within the window may include numerous aspects of the window, such as data, functionality, tasks, toolbar, menus, and controls of the window.

Figure 1A:
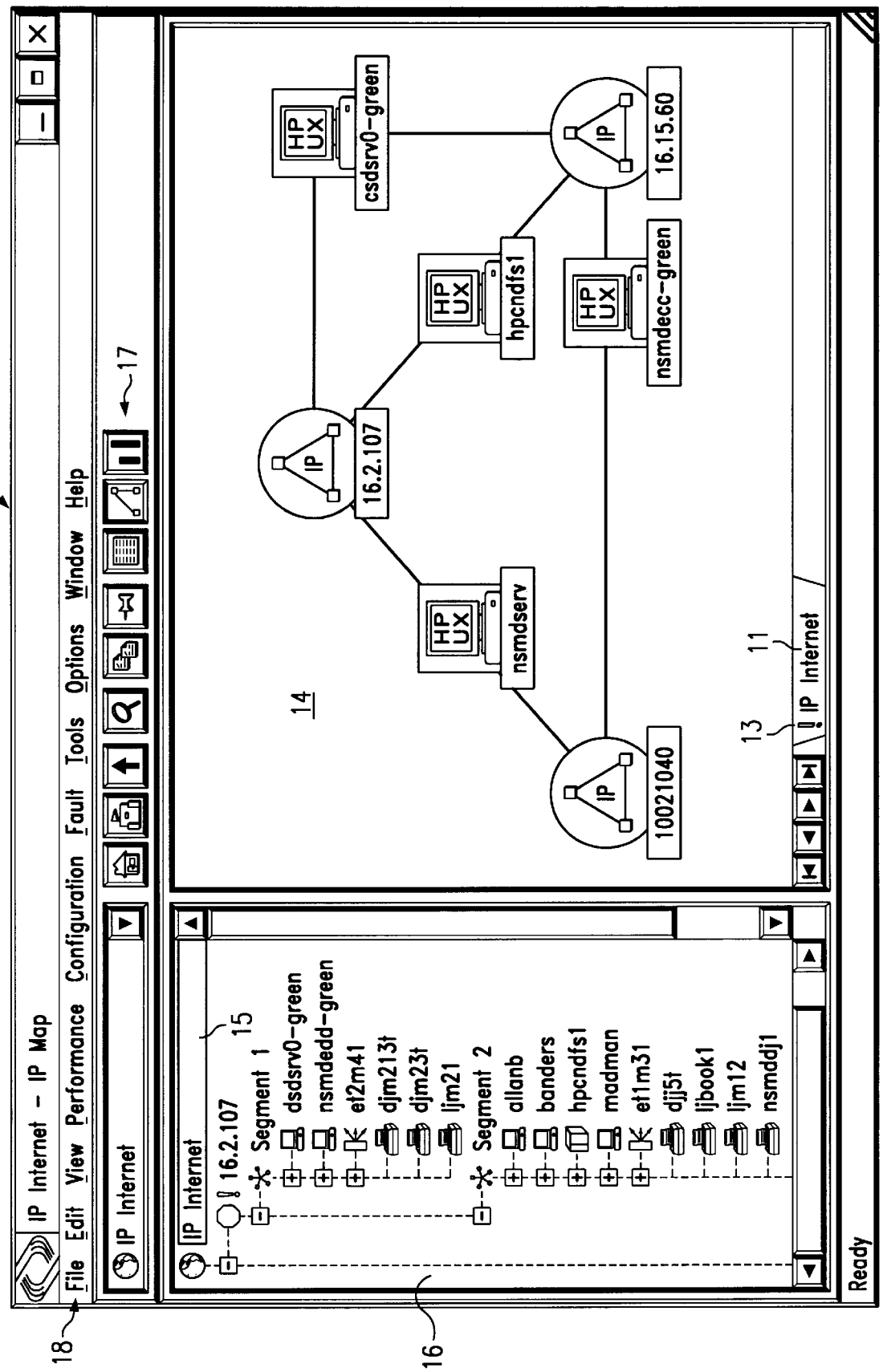
FIGS. 1a, 1b, 1c, 1d, 1e, and 1f illustrate the use of navigation tabs to navigate to different locations in the user interface and to quickly return to designated locations, according to the present invention.
Figure 1B:
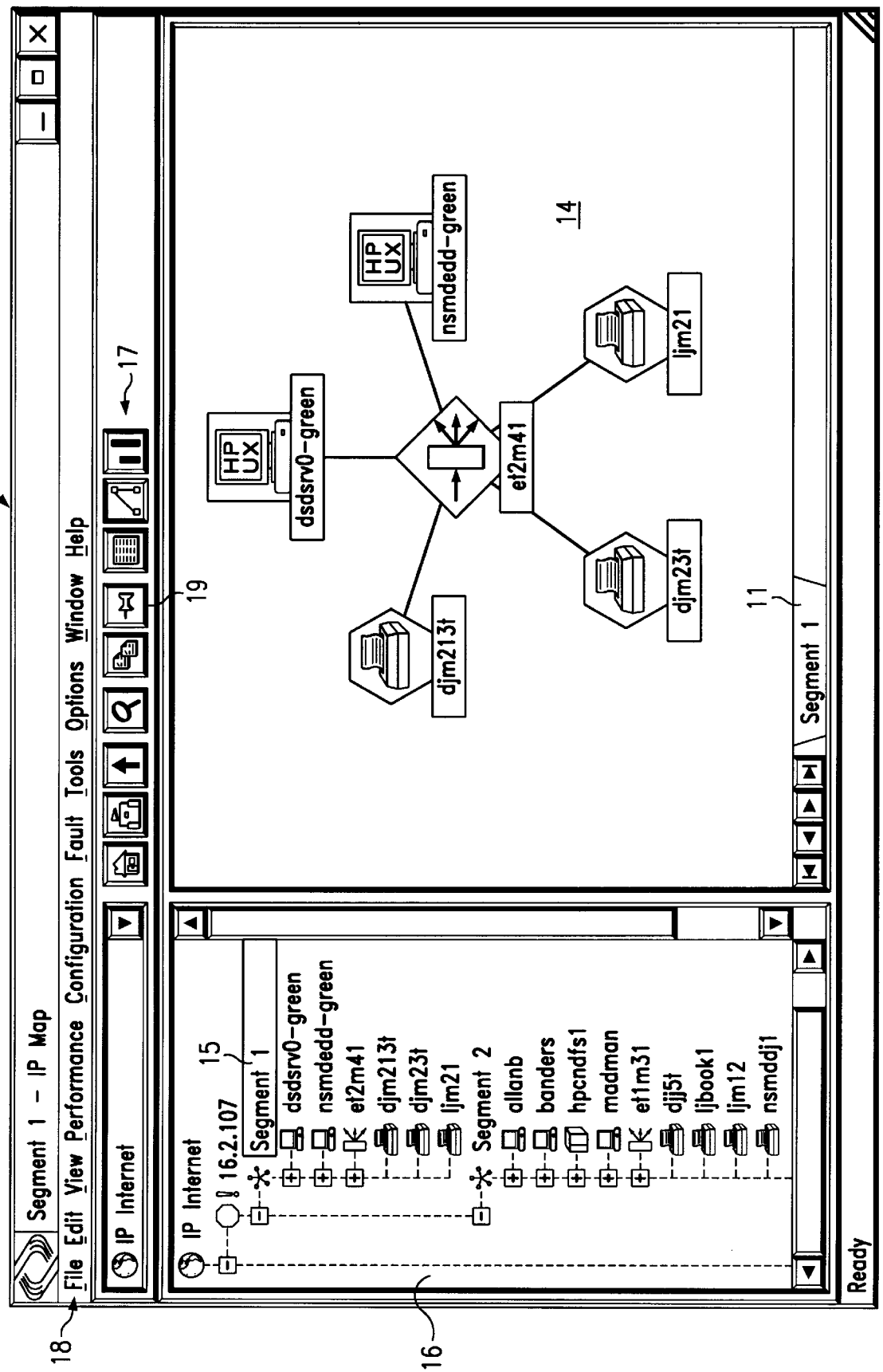
Figure 1C:
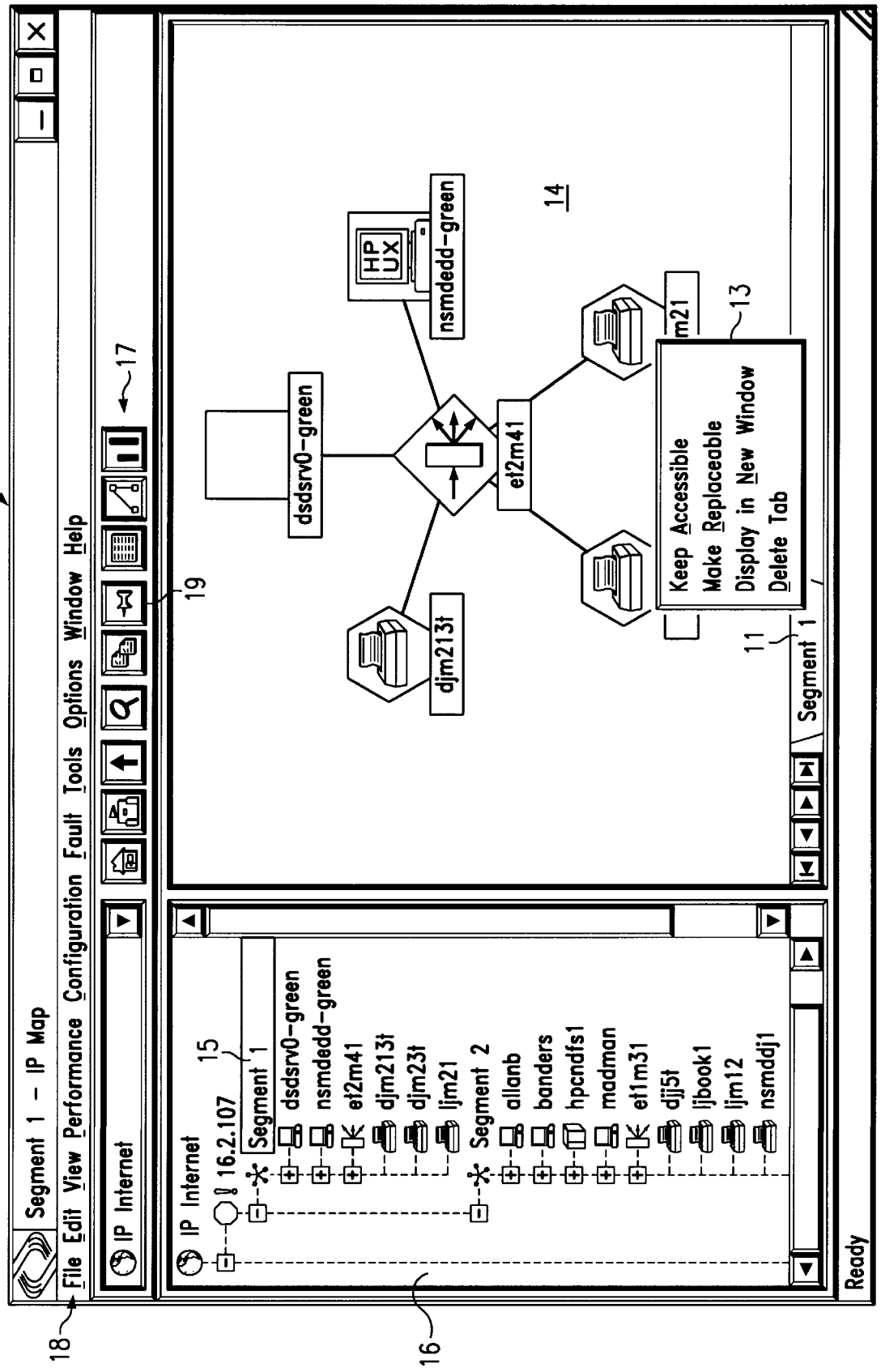
Figure 1D:
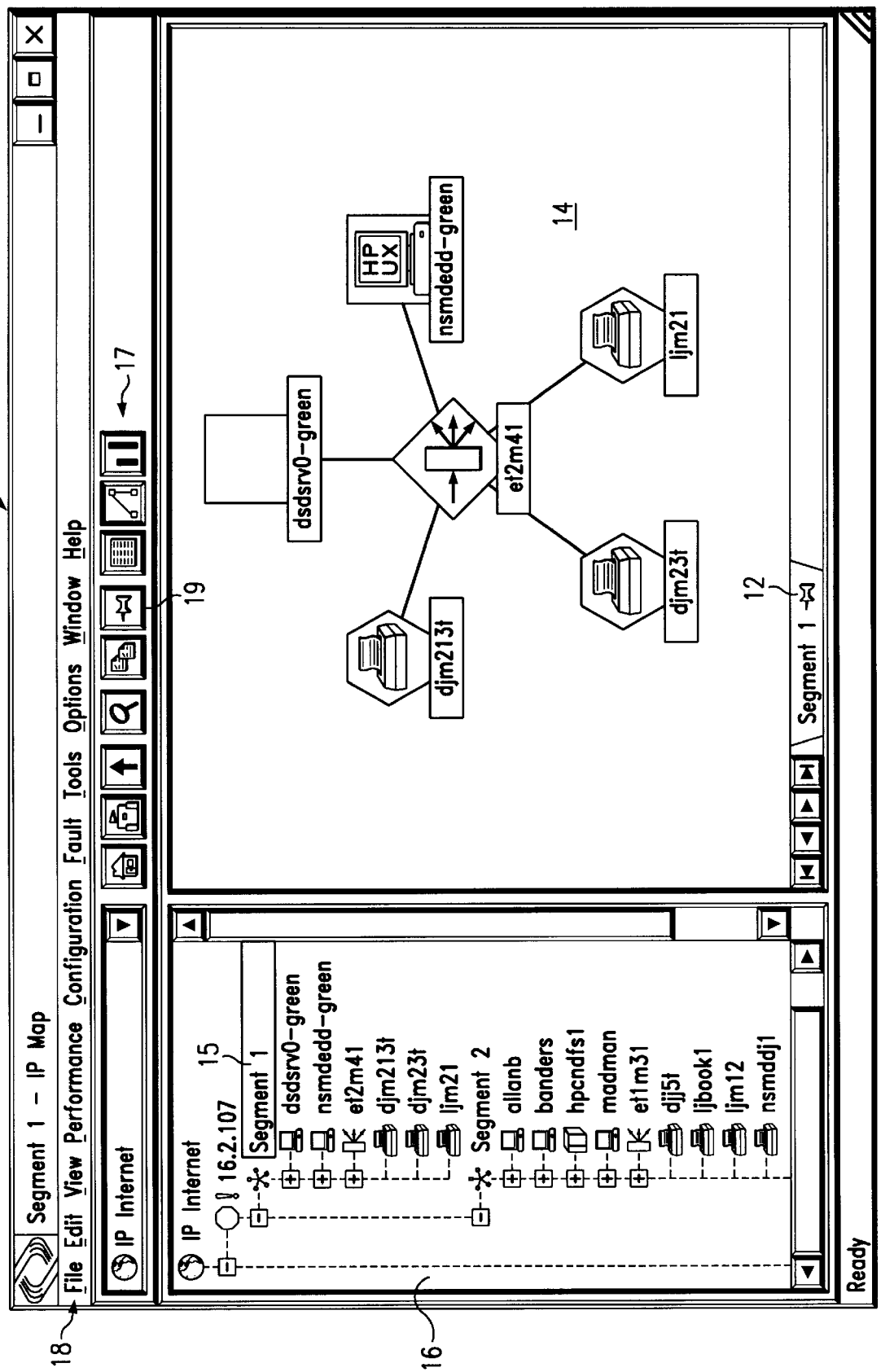

Navigation tabs are presented at the bottom of the content area of the window. The navigation tabs are similar to the tabs in a Rolodex with a label on the tab, as illustrated by navigation tab 11 of the window 10 of FIG. 1a. The label of the navigation tab indicates the current location within the application. When the user navigates to a new location within the application, the label of the navigation tab changes to show the new location. Until the user or application designates a location as one to which the user would want to return, the number of navigation tabs does not increase and the label in the existing navigation tab is replaced. If a location is designated as one to which the user will wish to return (i.e. "keep accessible"), a visual cue will be presented in the navigation tab to indicate that it is to be kept accessible; an example of such a visual symbol 12, in the form of a pushpin, is shown in FIG. 1d. When the user navigates from this location to a new location, a new replaceable navigation tab will appear, as illustrated by navigation tabs 11 and 12 of FIG. 1e.

Navigation tabs allow users to quickly move back to previously-accessed application locations. By selecting a navigation tab, the previous location defined by that navigation tab is presented in the window. Information, functionality, tasks, toolbar, menus, views of the window, and other capabilities of the previous location, are immediately available to the user.

Users can indicate an application location as one they want quick access to through selection of a menu item, such as a "keep accessible" menu item. Applications can also designate navigation tabs as "keep accessible" when it is anticipated that users will want quick access to the application locations. This may be accomplished in various ways as illustrated by the following three approaches. First, the navigation tab for an application location may be set to the "keep accessible" state when the application is first accessed. This will cause the navigation tab to be presented and available to the user when the application window is first opened. Second, the navigation tab for the view can have a "keep accessible" default state. While the navigation tab for that application location will not be presented to the user when the application window is first brought up, the navigation tab for that application location will be marked as "keep accessible" after it has been accessed by the user. Third, an application can designate a navigation tab as "keep accessible" when navigation away from the location will cause data to be lost as in a partially complete task or access to status information would become unavailable.

When the user no longer needs quick access to an application location, he or she can use the toolbar button or the menu to release the navigation tabs. Navigation tabs that are currently on top or that are otherwise active will differ in appearance from other non-active navigation tabs. For instance, active navigation tabs may be white while non-active navigation tabs appear in the same color as the background for dialog boxes and scroll bars in the content area of the window. There is no limit to the number of keep accessible navigation tabs that the user can have at one time. In the event that the number of navigation tabs becomes larger than the available display space in the content area of the window, a mechanism for scrolling navigation tabs may be provided.

Navigation tabs can be used to provide status information on locations in the application that are not currently visible but that have navigation tabs. This is done through visual markers or indicators such as symbols presented on the left hand side of the label of the navigation tab. The symbols can notify the user of the abnormal operational status of objects associated with the navigation tab. The degree of the abnormal operational status is often indicated by the color of the symbols. For instance, FIG. 1a shows a yellow exclamation mark 13, an example of a symbol, an indication of "minor problems" and FIG. 1e shows a red exclamation mark 13, an indication of "critical problems." If the navigation tab is associated with a task the symbols in the navigation tab may be used to indicate a change in task status such as successful task completion, as shown by symbol 13 of FIG. 3c, or errors in the task, e.g., an error in software installation.

An example of how the navigation tabs of the present invention can be used to re-access locations within an application window is presented in FIGS. 1a through 1f. These figures illustrate the behavior of navigation tabs when the user navigates to different locations in the user interface and wants to be able to quickly return to designated locations. As can be seen in user interface 10 of FIG. 1a, there is a navigation tab 11 at the bottom of the content area 14. The information presented in the content area is associated with the selected item "IP Internet" 15 in scoping pane 16. The label for the navigation tab "IP Internet" indicates the location with which the tab is associated. In this application, selection of another item in the scoping pane, causes the user interface to navigate to a new location. If the user were to select "Segment 1," user interface 20 shown in FIG. 1b would be presented. As can be seen, "Segment 1" 15 is shown as selected in the scoping pane 16. The content pane 14 displays the systems found in "Segment 1." There continues to be a single navigation tab 11 at the bottom of the content area and the label has changed to "Segment 1."

Assume that the user were to designate "Segment 1" as a location to be re-accessed. As shown in the user interface 30 of FIG. 1c, this could be done by either selecting the appropriate toolbar button 19, menu item in the pull down menus 18 or menu item in the pop-up menu 13 associated with the navigation tab 11. Once this designation is made, the navigation tab will contain a visual indication to show that it is to be maintained so that the location will remain accessible. One example of a visual indication for a "keep accessible" navigation tab 12 is presented in the user interface 40 of FIG. 1d.

Figure 1E:
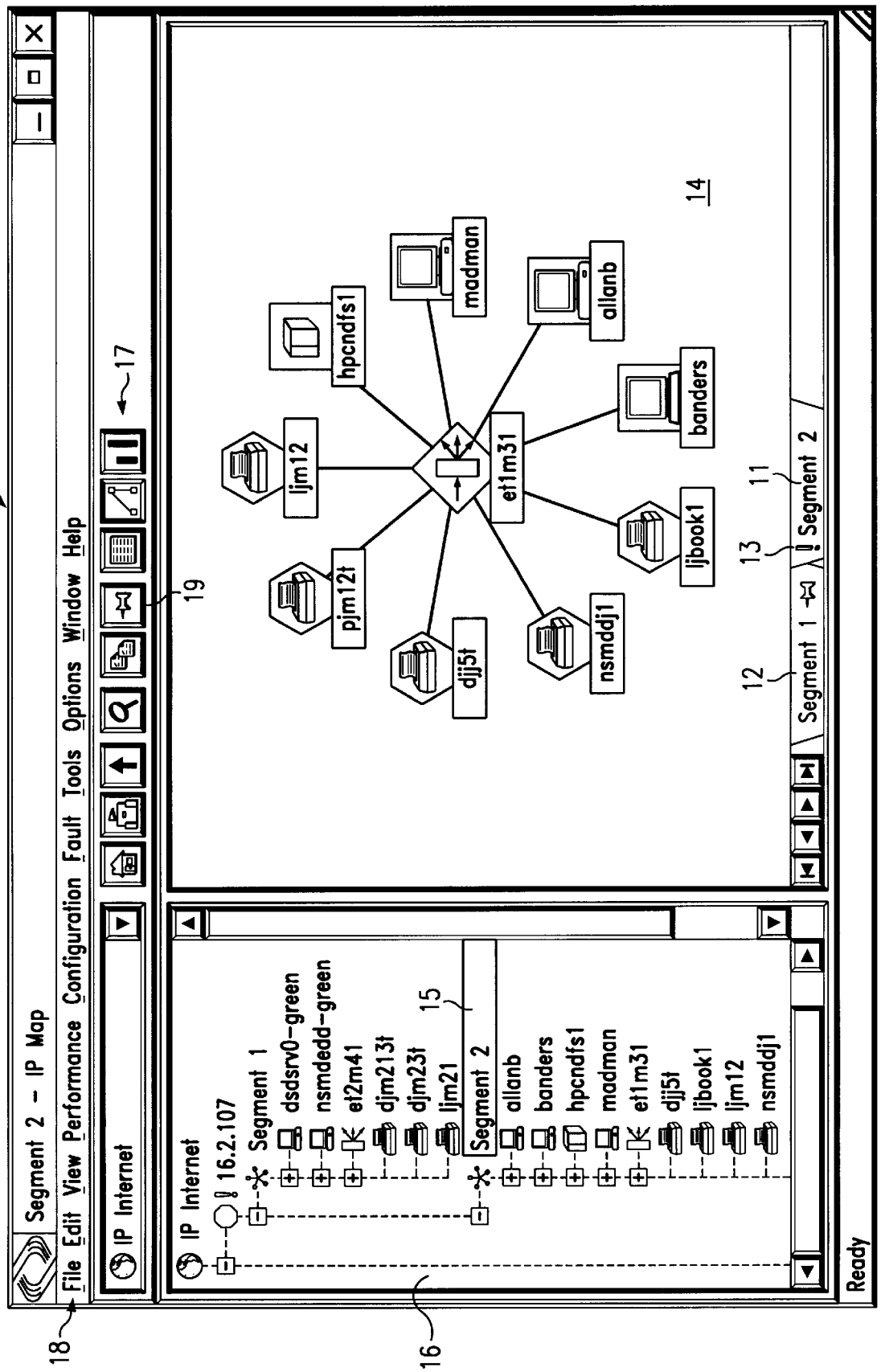

If the user were to navigate to another location in the application, i.e., select "Segment 2" item 15 in scoping pane 16, the "Segment 1" location would remain available through the navigation tab 12 shown in the user interface 50 of FIG. 1e. As can be seen in this figure, there are two navigation tabs 11 and 12 at the bottom of the content area 14. Navigation tab 11 is a replaceable tab and Navigation tab 12 is one that has been marked as "keep accessible" with the pushpin symbol. Note that Navigation tab 11 is white to indicate that it is associated with the currently visible information. Navigation tab 12 is gray to indicate that it is not currently active. Selection of navigation tab 12 would result in the presentation of user interface 40 presented in FIG. 1d.

Figure 1F:
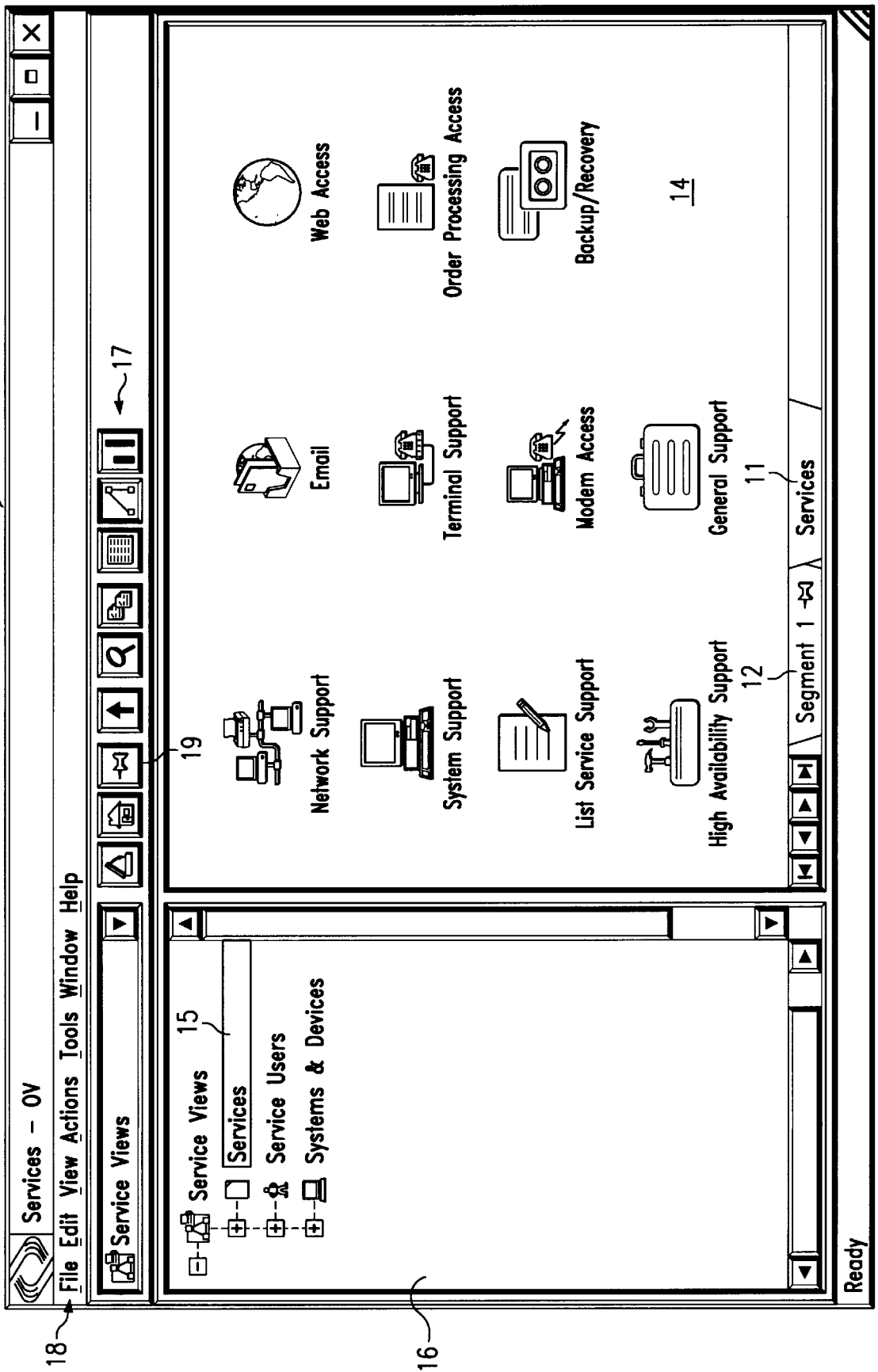

If the user were to navigate to another location within the application, the "keep accessible" navigation tab 12 would continue to remain available while the "replaceable" navigation tab 11 would be replaced with one for the new location. FIG. 1f illustrates the user interface 60 of the same application window after the user has navigated to a completely different area of the application. The contents of the scoping pane 16 have changed to show the following Service Views: Services, Service Users and Systems and Devices. "Services" 15 is the currently selected item in the scoping pane. The content area 14 shows the services that are supported by the application. There are two navigation tabs at the bottom of the content area, one for "Segment 1" 12 and the other for the current location "Services" 11. While the user can no longer access "Segment 1" through selections in the scoping pane, clicking on its associated navigation tab 12 will immediately change back to the user interface 40 presented in FIG. 1d. The navigation tab 11 in FIG. 1e will disappear. When the user no longer needs access to "Segment 1," he or she can release it by using the appropriate control in the pull down menus 18, pop-up menus (as illustrated by pop-up menu 13 of FIG. 1c) or tool bar button 19.

The above discussion describes the use of navigation tabs to navigate to different logical locations within a single application. Navigation tabs may also be used to provide access to views across applications. For instance, in FIG. 1e, "Segment 1" navigation tab 12 and "Segment 2" navigation tab 11 could be representative of locations from two different applications, rather than locations from the same application as discussed above. Because both of these navigation tabs are shown simultaneously in the same window, the user may easily and readily gain access to views from different applications.

Figure 2A:
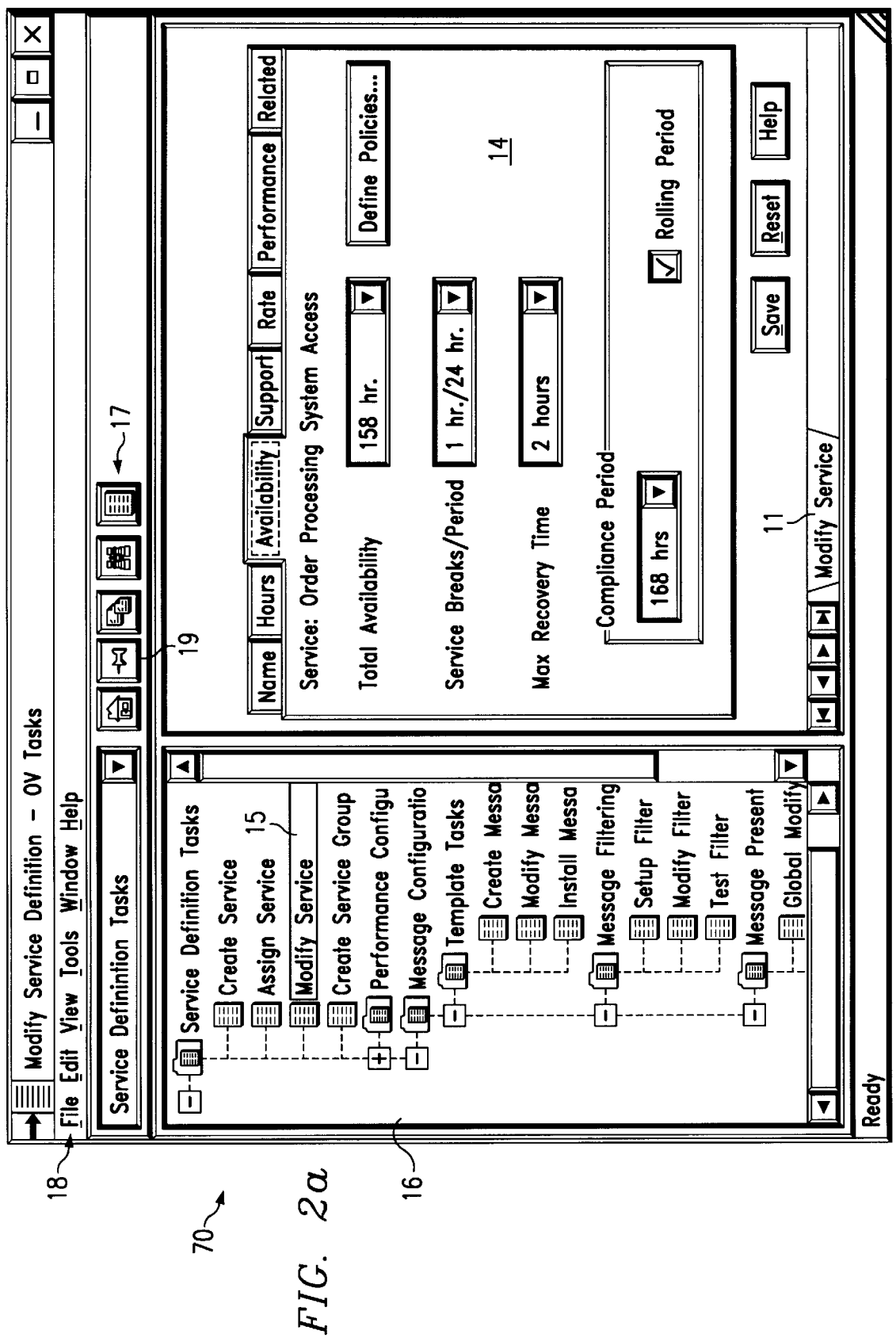
FIGS. 2a and 2b illustrate the use of navigation tabs when a task needs to be suspended and re-accessed, according to the present invention.
Figure 2B:
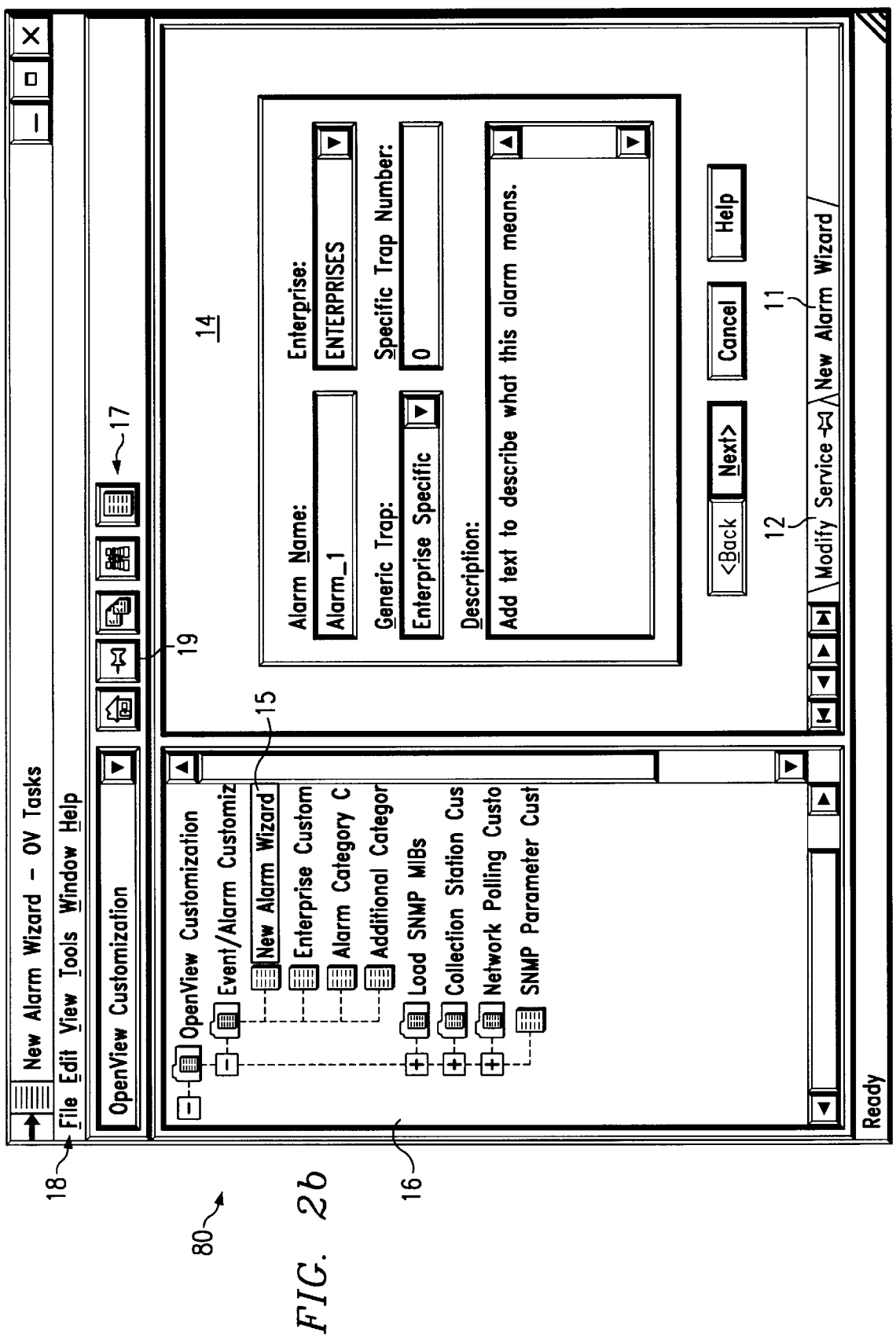

Now consider an example in which navigation tabs are used to re-access an interrupted task. FIGS. 2a and 2b illustrate the use of navigation tabs when a task needs to be suspended and re-accessed. Presented in FIG. 2a, is a user interface 70 of an application window in which the user carries out a routine task. The scoping pane 16 shows the list of related tasks. The task that the user is working on, "Modify Service" 15, is selected in the scoping pane 16. The content area 14 shows a properties box for making the necessary modifications. At the bottom of the content area 14 is a replaceable navigation tab 11 for the. "Modify Service" location. Assume that the user is interrupted and must complete another task before proceeding with the modify service task. The user can use a menu item or tool bar button to designate the current location as keep accessible. If the user does not designate the location as keep accessible, the application will automatically perform the keep accessible designation for the user to keep data from being lost when the user navigates to a new task location.

Referring to FIG. 2b, the user interface 80 that is presented after the user has navigated to a different area of the application that presents a wizard for setting up a new alarm is shown. Notice that the contents of the scoping pane 16 have changed and that the current selection 15 is for the "New Alarm Wizard". The content area 14 is displaying the wizard for accomplishing the selected task. There are two navigation tabs at the bottom of the content area 14. One tab is a replaceable tab 11 for the current location in the application and the other tab 12 is one that keeps accessible the initial task of modifying the service from FIG. 2a. Navigating within the wizard with the "Next" and "Back" buttons will have no affect on either of the navigation tabs. When the user finishes the task of defining the new alarm, he or she can return to their original task with a single click on the navigation tab 12. When the user returns to this task, he or she will be presented with the same properties box as was presented in FIG. 2a with all data from the initial data entry intact.

As previously mentioned, navigation tabs may not only be used to navigate to different locations within a single application, they may be used to navigation to different locations across multiple applications. Consider, for instance, that the "Segment 1" navigation tab shown in FIGS. 1b–1f is representative of a location from a first application while the "Modify Service" navigation tab shown in FIGS. 2a–2b is representative of a location from a second application. According to the present invention, it is possible to have both the "Segment 1" navigation tab and the "Modify Service" navigation tab in the same window at the same time, thereby allowing the user to readily view either location by simply selecting the navigation tab.

Finally consider the case in which the user has been performing a task and the task has reached a stage that no longer requires on-going user interaction but instead requires system processing, e.g. installation, extensive searches of databases, or extensive number crunching. In traditional user interfaces, the user is presented with a dialog box with a progress indicator. Users typically must keep this dialog box up and running or they will not be able to determine whether their task was successfully completed or not. Navigation tabs provide an alternative to this approach. They allow the user to go on to other tasks and still be notified when the system processing is complete. Details about success or failure of the task will remain available to the user.

FIGS. 3a through 3d present a scenario that demonstrates the way in which navigation tabs provide these benefits in situations in which a task takes a large amount of system time to complete and the user wants to go on to other tasks. Assume that the user has finished providing information to the application and the application is now installing messages on a number of remote systems. This installation may take a large amount of time and in the meantime the user has other tasks that must be accomplished, including a relatively urgent task of changing the SNMP parameters for a set of systems. As can be seen in user interface 90 of FIG. 3a, the content pane 14 presents the user with a message indicating that the installation is in progress. There are two navigation tabs at the bottom of the content area. One tab is a replaceable tab for the current location in the application 11 and the other tab is one that keeps accessible the previous task of adding a user. The user can use a menu item 18 or tool bar button 19 to designate the current location as keep accessible. If the user does not designate the location as keep accessible, the application will automatically make the designation for the user to prevent the information on the status of the task from being lost when the user navigates to a new task location.

Figure 3A:
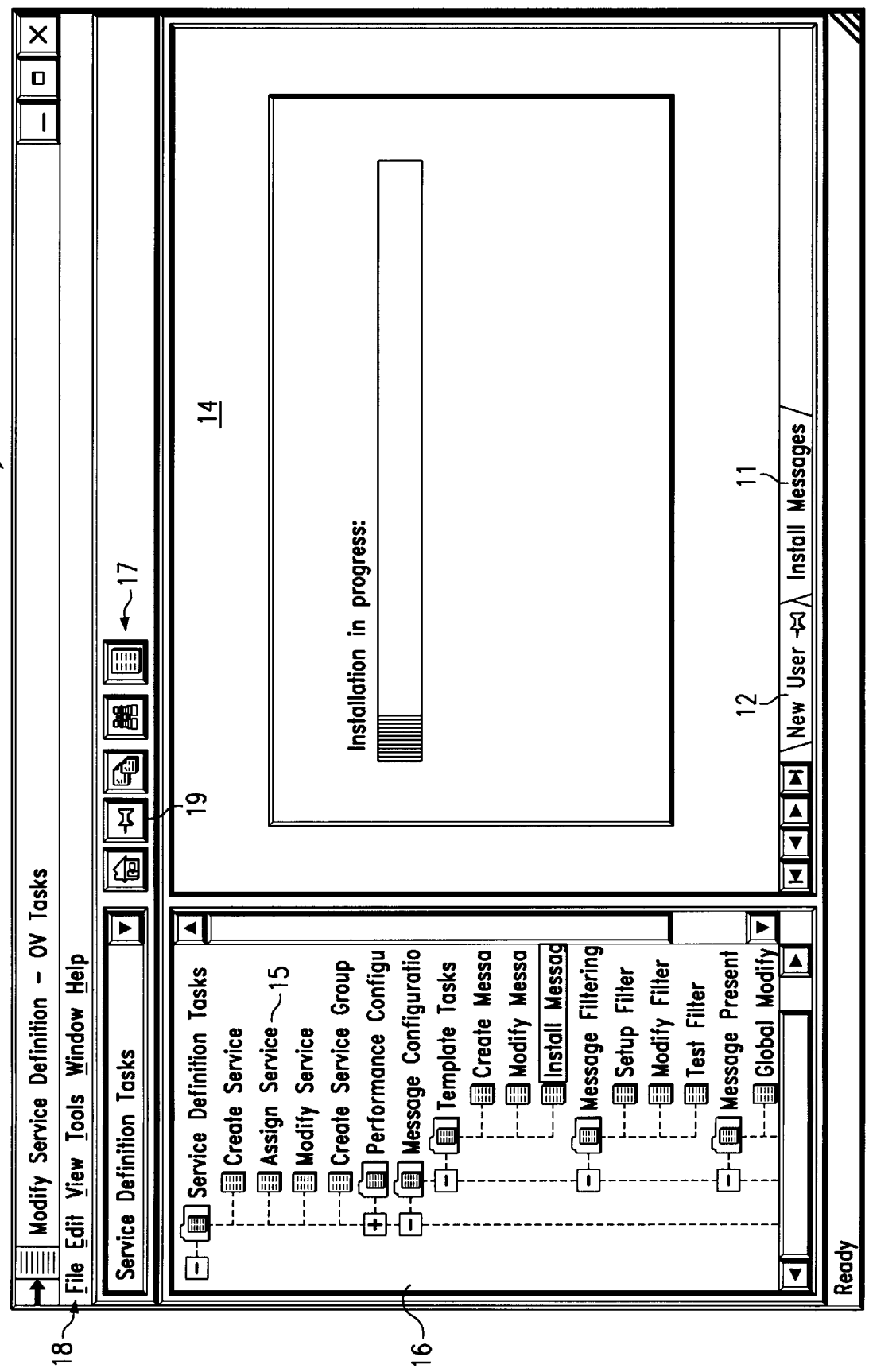
FIGS. 3a, 3b, 3c, and 3d illustrate the use of the navigation tabs for a time consuming task in which the user wants to go on to other tasks, according to the present invention.
Figure 3B:
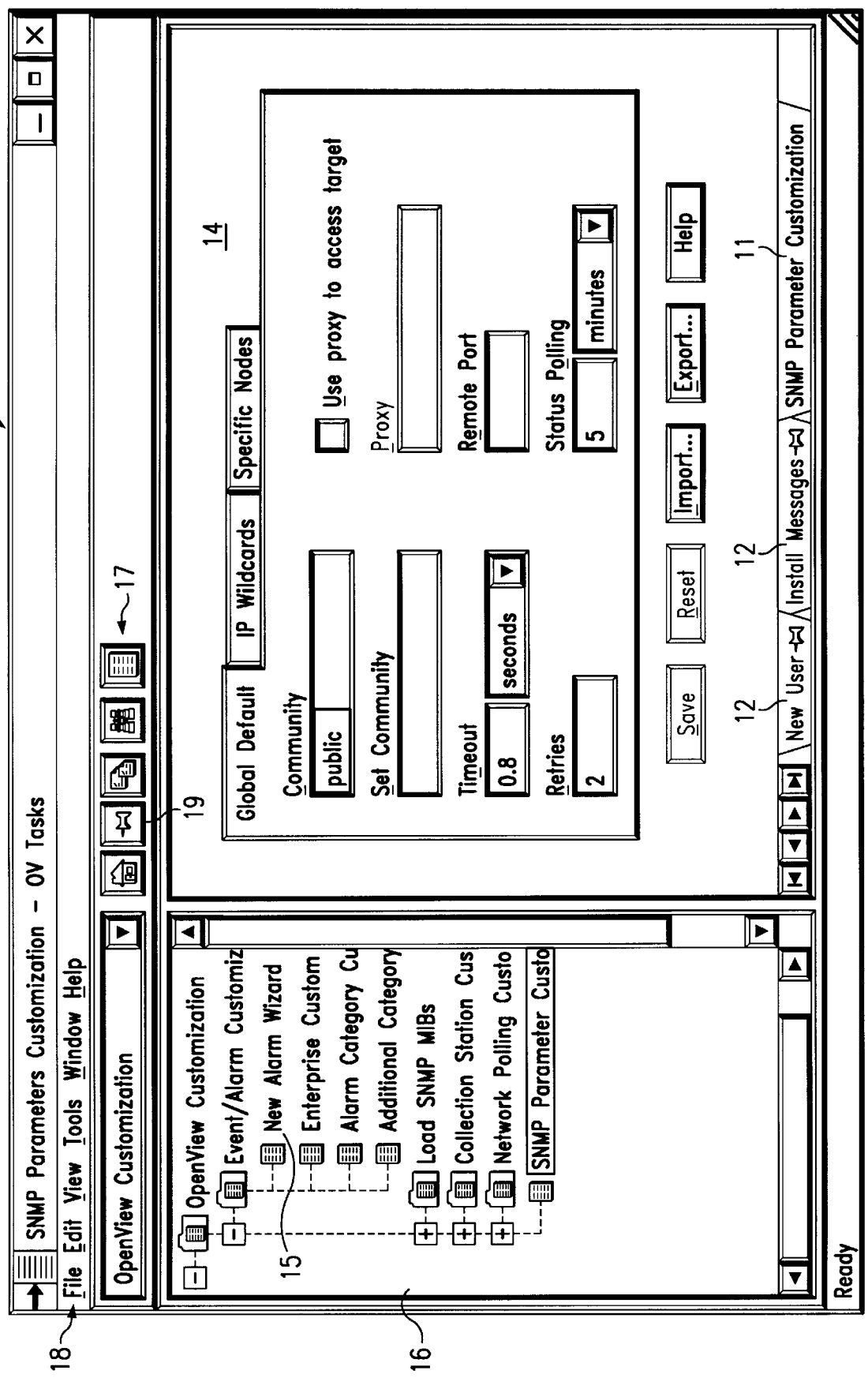
Figure 3C:
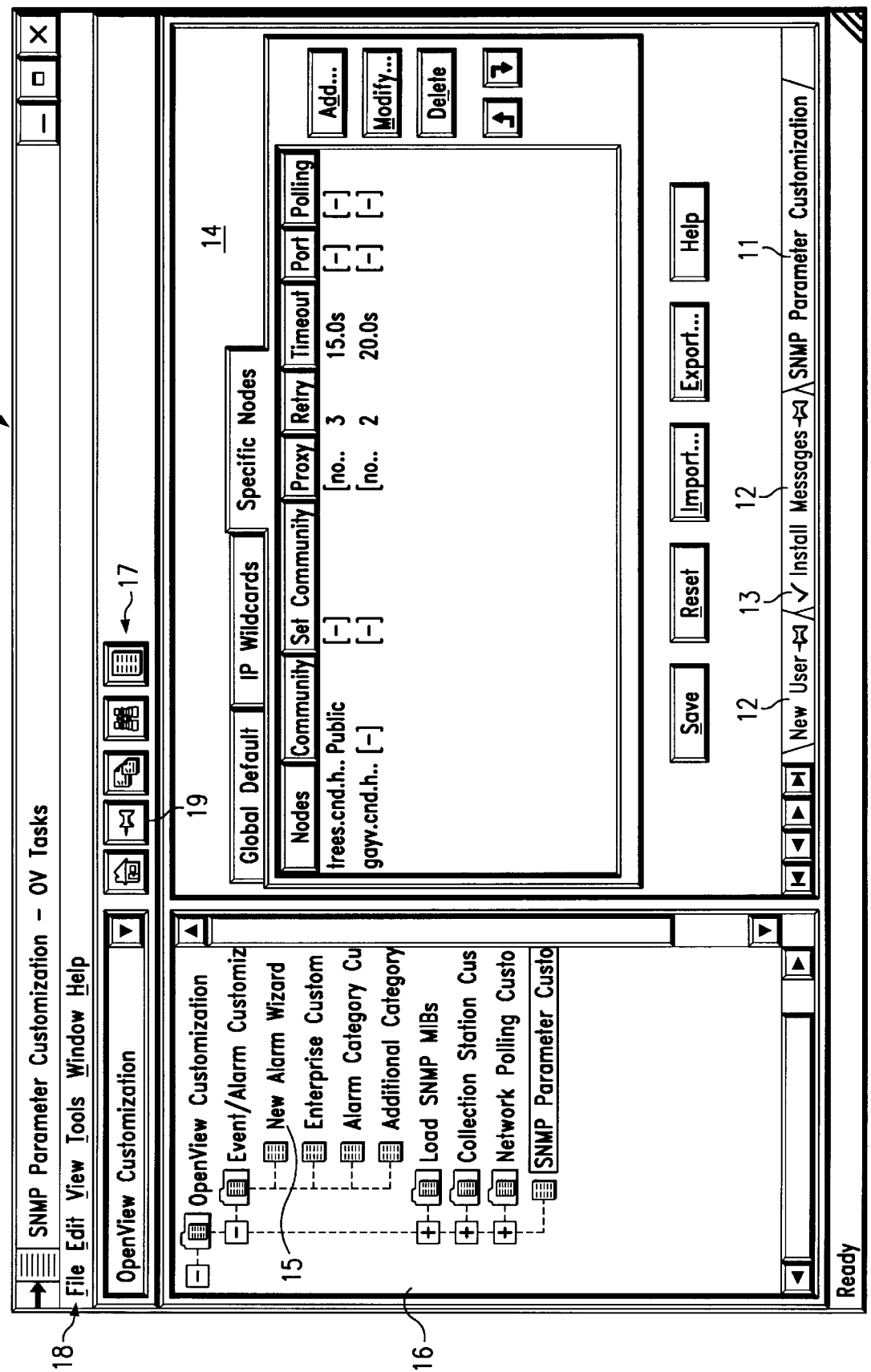
Figure 3D:
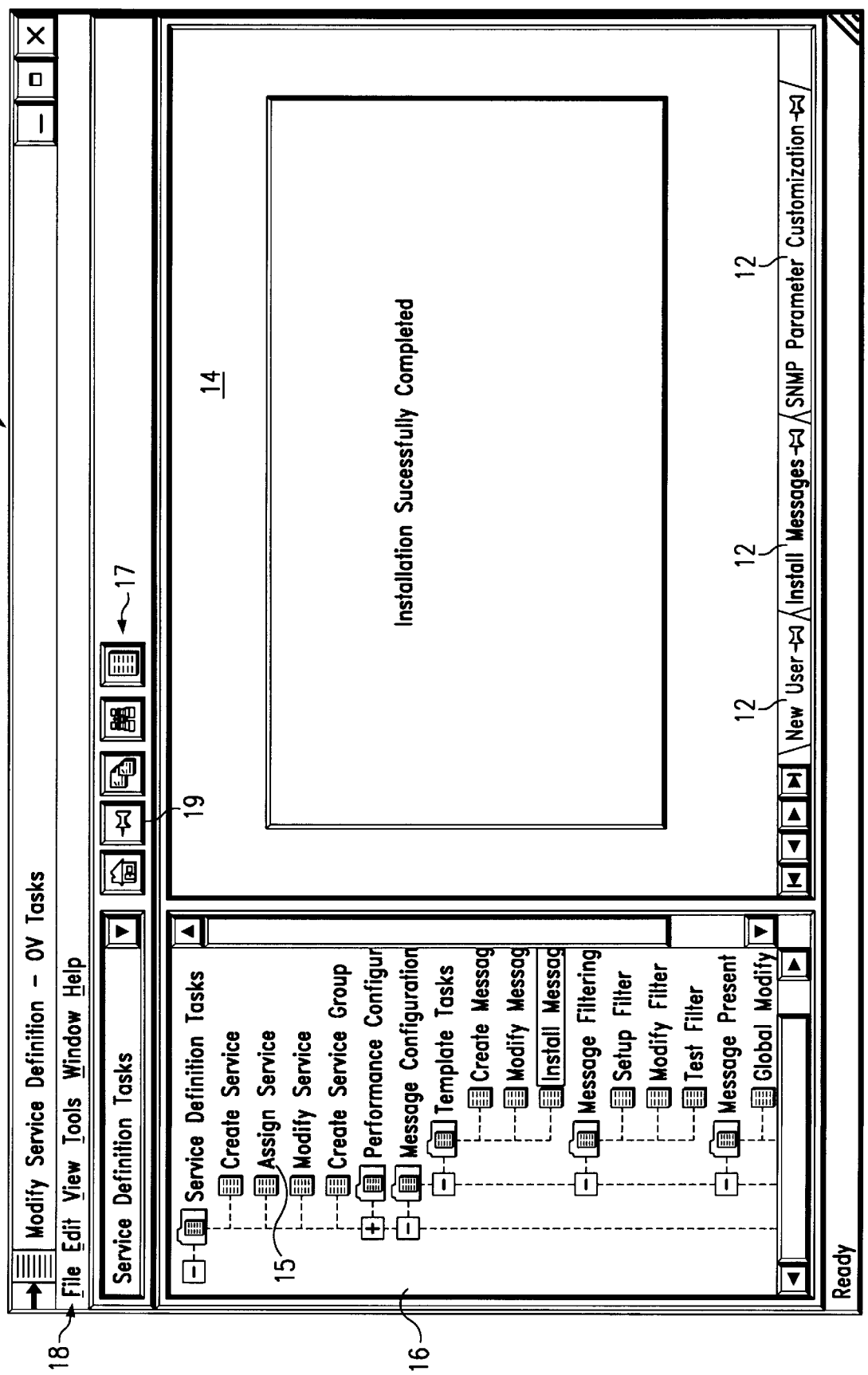

When the user navigates to a new location to make the modifications to the SNMP configuration, they will be presented with the user interface 100 in FIG. 3b. The content area 14 contains two "keep accessible" navigation tabs 12 and one tab 11 for the current application location. The user can therefore proceed to enter the necessary information for the SNMP configuration task. If the installation was to complete while the user was doing the SNMP task, the navigation tab for the installation task would present a symbol, such as a check mark 13, to indicate that the task associated with the navigation tab should be checked, as shown in FIG. 3c. Clicking on the navigation tab for the install task will cause the application location for this task to be displayed and the navigation tab for the SNMP task to be automatically designated as keep accessible (since that task was incomplete). As can be seen in FIG. 3d, the user now has access to the information on whether the installation was or was not successful.

There are several operations on the navigation tabs that are included in the present invention, including "make replaceable", "keep accessible", "display in new window", and "close tab". Each of these operations can be presented to the user through menu items, toolbar buttons or a combination of the two. When the user clicks on a navigation tab with the menu button of the pointing device, a pop-up menu containing the various menu items for tab states is presented to the user and is shown In FIG. 1c. The "Make Replaceable" and "Keep Accessible" operations were demonstrated in the previous scenarios.

Figure 4A:
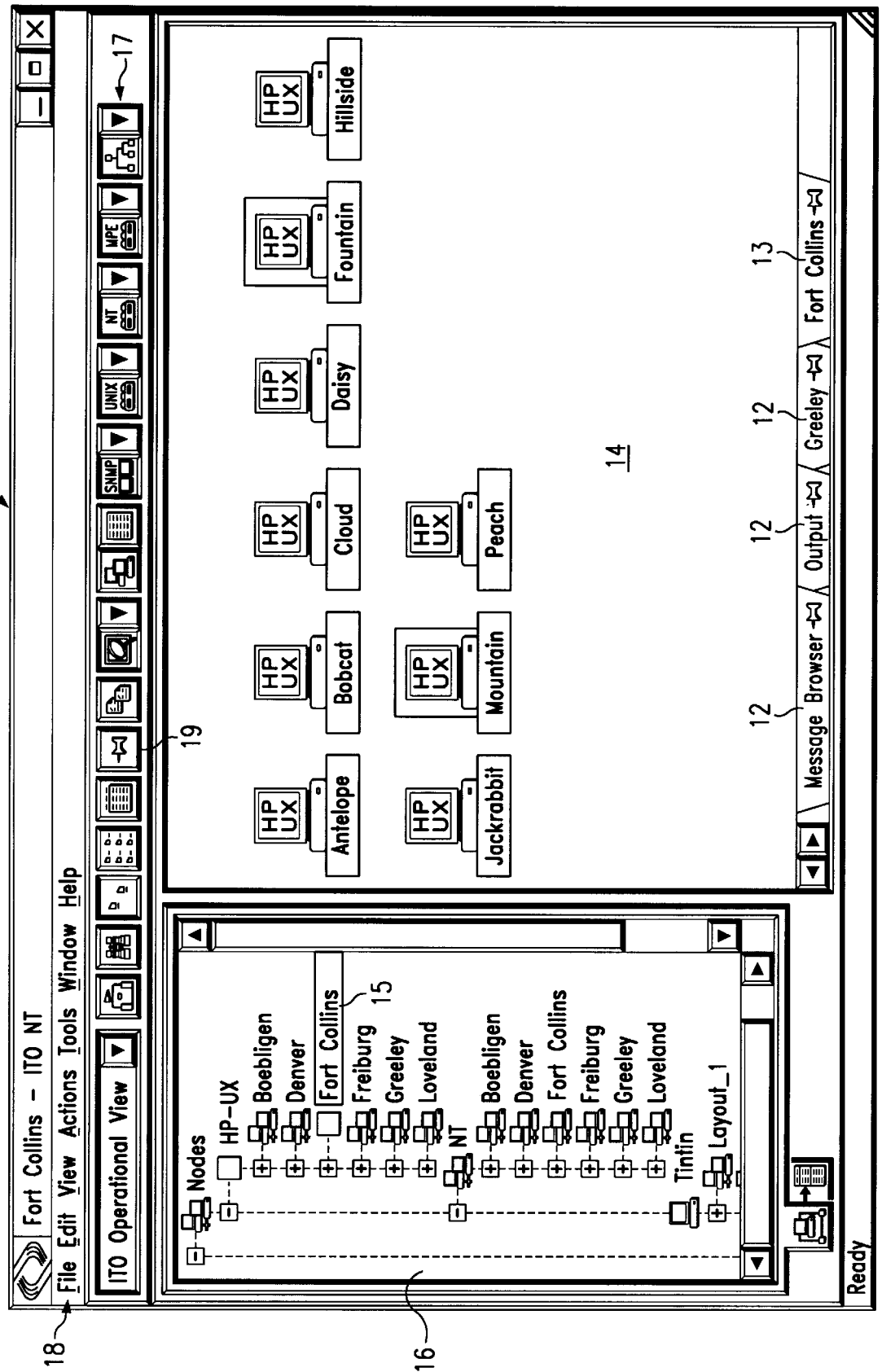
FIGS. 4a, 4b, and 4c illustrate some of the operations that can be carried out on navigation tabs, according to the present invention.
Figure 4B:
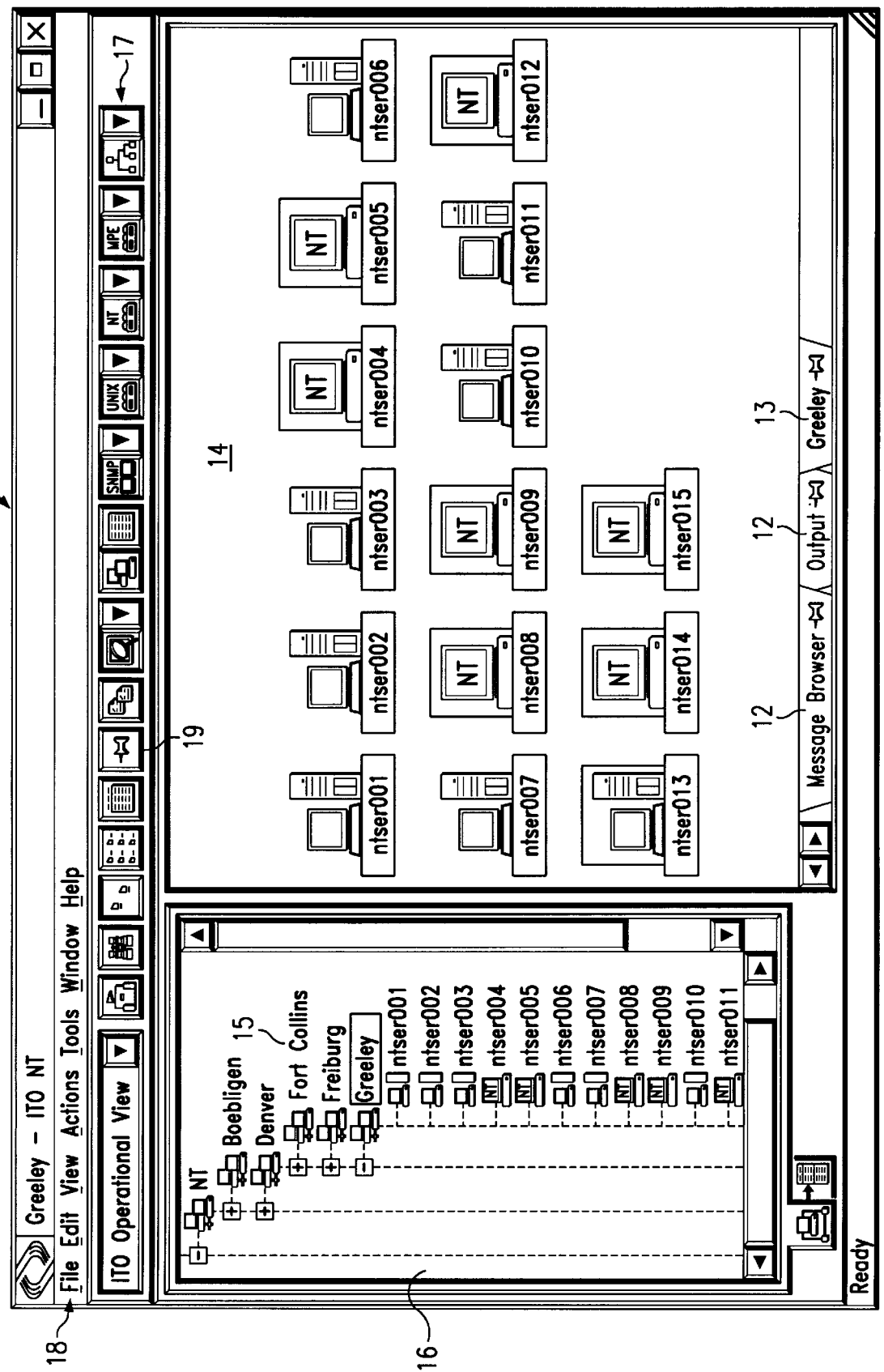
Figure 4C:
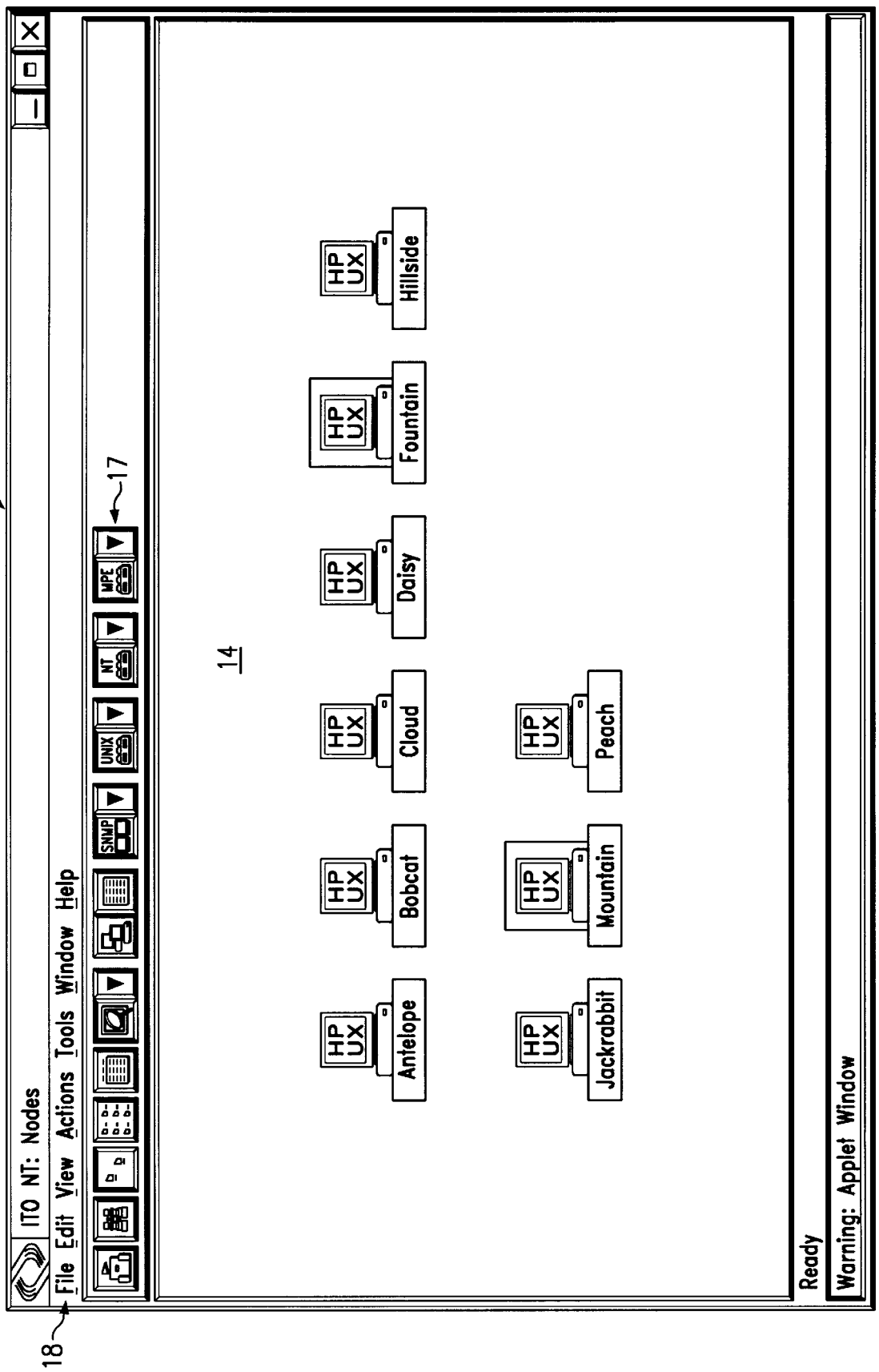

The operation "display in new window" causes the contents of the navigation tab to be presented in a new window. If the application of the current window supports child windows, the navigation tab is removed and a child window containing only the selected navigation tab is presented, as shown in FIGS. 4a, 4b and 4c. If the application of the current window supports copied windows, the "display in new window" operation would result in two identical windows. For example, if the application in FIG. 4a supported copied windows, two windows with user interface 130 would be presented.

The relationship between child and parent windows vis-a-vis navigation tabs will now be explored. When the user moves the contents of a navigation tab into a child window with the "display in new window" operation, the navigation tab that was most recently visited will be presented as the active tab in the parent window. For example, if the user were to access the "display in new window" operation for the "Fort Collins" navigation tab 13 in FIG. 4a, user interface 140 would be replaced by user interface 150 in FIG. 4b. The child window would appear as interface 160 in FIG. 4c.

When a user takes action to return a child window to the parent window, the contents of the child window will be presented as the active tab in the current window and its navigation tab state, whether "reusable" or "keep accessible," will be the same as it was when the user originally took the action to present the tab in the child window. For example, the windows in FIGS. 4b and 4c would be merged to appear as the window in FIG. 4a.

The operation "close tab" causes the navigation tab to be removed. If a navigation tab is currently on top when the "close tab" operation is selected, the user interface of the window will default to the application location associated with the navigation tab that was viewed just prior to this navigation tab. For example, if the user were to use the "close tab" operation on navigation tab 13 for "Fort Collins" in FIG. 4a, the result would be the presentation of user interface 150 in FIG. 4b. If the most recently visited navigation tab is the last remaining navigation tab in the parent window, then one of three things may occur. First, the user will be allowed to close the navigation tab. The user would subsequently be presented with a new navigation tab and its associated view, such as the last location. Second, the menu item and the toolbar button for the "close tab" state may be made inaccessible by making them gray, for instance, so that the user will not attempt to take this action. Third, the user will be presented with a confirmation dialog box that inquires as to whether the user wants to exit the application since closing the navigation tab will close the last visible location in the application.

The navigation tabs of the present invention provide many advantages to the user. First, the use of navigation tabs minimizes the number of open windows that are required to present application locations or sets of information to the user. Second, the use of navigation tabs minimizes the number of user actions that are required to access application locations or sets of information. This addresses the prior art concern of the significant amount of time required for a user to move back and forth between information sets or locations, especially when the user must accomplish a complex or time critical job as quickly as possible. Third, the use of navigation tabs enables users to move between tasks without loosing data. This overcomes the prior art concern that users performing complex jobs that are interrupted should be able to move between tasks without loosing data. The navigation tabs of the present invention allow the user to suspend an initial task, hide the GUI for that task and return to it once a more urgent, interrupting task is completed. Fourth, the use of navigation tabs provides non-intrusive status information to the user about applications that are not currently visible. This allows users that are performing tasks that require a large amount of time for system processing to proceed to other tasks while the system continues to work on the system-intensive tasks.

While the invention has been particularly shown and described with reference to a preferred embodiment, it will be understood by those skilled in the art that various changes in form and detail may be made therein without departing from the spirit and scope of the invention. For instance, one skilled in the art will recognize that variations in the states, appearance, and operation of the navigation tabs may be made without departing from the spirit and scope of the invention.

What is claimed is:

1. A user interface of a window in a windows-based computer environment that provides means for preserving and re-accessing different locations within the window, comprising:

a scoping pane of the user interface having a plurality of locations that are available to be selected by a user of the user interface, wherein each location of the plurality of locations has a set of content information that on be presented to the user;

a content pane of the user interface that presents the set of content information associated with a location of the plurality of locations that is selected in the scoping pane by the user; and one or more navigation tabs in the content pane, with each navigation tab of the one or more navigation tabs associated with a location of the plurality of locations and having a label representative of the associated location within the window;

wherein a label of an active navigation tab reflects a current location of the plurality of locations that is currently selected in the scoping pane within the window and presented in the content pane but the label of the active navigation tab changes to reflect a new location of the plurality of locations within the window when the user navigates from the current location to the new location by selecting the new location in the scoping pane unless the current location has been designated a keep accessible location, wherein if the current location has been designated a keep accessible location, the label of the active navigation tab will have a keep accessible marker indicating the current location as a keep accessible location and when the user navigates from the current location to the new location, a new navigation tab having a label that reflects the new location will appear in the content pane of the user interface, and wherein the user can navigate from the new location back to the current location via the active navigation tab of the current location and access the set of content information associated with the current location and previously displayed in the content pane.

2. The user interface of claim 1, wherein the keep accessible marker is a pushpin.

3. The user interface of claim 1, wherein the current location is designated a keep accessible location by the user.

4. The user interface of claim 3, wherein the user designates the current location a keep accessible location by selecting a keep accessible menu item.

5. The user interface of claim 3, wherein the user designates the current location a keep accessible location by selecting a keep accessible tool bar button.

6. The user interface of claim 1, wherein the current location is designated a keep accessible location by an application of the window.

7. The user interface of claim 6, wherein the current location is designated a keep accessible location by setting the current location to a keep accessible state when the current location is initially accessed, thereby causing the current location to be presented to the user when the window is initially opened.

8. The user interface of claim 6, wherein the current location is designated a keep accessible location because the active navigation tab has a keep accessible default state for the current location, thereby causing the active navigation tab to have a keep accessible state after the user has accessed the current location.

9. The user interface of claim 1, wherein a label of a navigation tab of the one or more navigation tabs provides a status information about a location within the window that is indicated by the label.

10. The user interface of claim 9, wherein a status information marker on the label of the navigation tab provides the status information about the location.

11. The user interface of claim 10, wherein the status information disappears from the label of the navigation tab after the user has selected the navigation tab to view the location.

12. The user interface of claim 1, wherein the current location and the new location are locations of an application of the window.

13. The user interface of claim 1, wherein the current location is a location of a first application of the window and the new location is a location of a second application of the window.

14. The user interface of claim 1, further comprising:
a means for scrolling the one or more navigation tabs.

15. The user interface of claim 1, further comprising:
a child window in which a view of the location of the active navigation tab is presented when a display in new window operation is performed on the active navigation tab, wherein the active navigation tab appears in a content pane of the child window and the window has a new active navigation tab equal to a most recently active navigation tab of the window.

16. A user interface of a window in a windows-based computer environment that provides means for preserving and re-accessing different locations within the window, comprising:

a scoping pane of the user interface;

a content pane of the user interface; and one or more navigation tabs in the content pane, with each navigation tab of the one or more navigation tabs having a label that indicates a location within the window;

wherein a label of an active navigation tab reflects a current location within the window that is presented in the content pane but changes to reflect a new location within the window when the user navigates from the current location to the new location unless the current location has been designated a keep accessible location, wherein if the current location has been designated a keep accessible location, the label of the active navigation tab will have a keep accessible marker indicating the current location as a keel accessible location and when the user navigates from the current location to the new location, a new navigation tab having a label that reflects the new location will appear in the content pane of the user interface, and wherein the current location is designated a keep accessible location by an application of the window and wherein the application of the window designates the current location a keep accessible location if user navigation away from the current location will cause data to be lost or access to a status information to become unavailable to the user.

17. A method for preserving and re-accessing different locations within a window of a windows-based computer environment, said method comprising:

navigating to a first location within the window, wherein the first location has a set of content information that can be presented to the user in a content pane of the window;

navigating to a second location within the window, wherein the second location has a set of content information that can be presented to the user in the content pane of the window; and changing a label of a first navigation tab in the content pane of the window to reflect the second location unless the first location has been designated a keep accessible location, in which case a second navigation tab having a label that reflects the second location appears in the content pane of the window and the label of the first navigation tab reflects the first location, wherein if the first location has been designated a keep accessible location the user can navigate from the second location back to the first location via the first navigation tab and access the set of content information of the first location.

18. The method of claim 17, wherein a keep accessible location is indicated by a keep accessible marker of the label.

19. The method of claim 18, wherein the keep accessible marker is a pushpin.

20. The method of claim 17, further comprising:
if the first location has been designated a keep accessible location, selecting the first navigation tab to navigate to the first location within the window; and
if the second location has been designated a keep accessible location, selecting the second navigation tab to navigate to the second location within the window.

21. The method of claim 17, further comprising:
providing a first status information about the first location within the window to the user.

22. The method of claim 21, wherein the first status information is provided by a first status information marker on the label of the first navigation tab.

23. The method of claim 22, wherein the first status information disappears from the label of the first navigation tab after the user has selected the first navigation tab to view the first location.

24. The method of claim 17, further comprising:
providing a second status information about the second location within the window to the user.

25. The method of claim 24, wherein the second status information is provided by a second status information marker on the label of the second navigation tab.

26. The method of claim 25, wherein the second status information disappears from the label of the second navigation tab after the user has selected the second navigation tab to view the second location.

27. The method of claim 17, further comprising:
performing a display in new window operation on an active navigation tab of the window;
presenting a view of the location of the active navigation tab in a child window; and
causing the active navigation tab of the window to revert to a most recently viewed navigation tab of the window.

28. The method of claim 27, further comprising:
returning the child window to the window by causing the active navigation tab of the window to reflect the location presented in the child window, wherein the active navigation tab has an operation state that the active navigation tab had when the display in view window operation was performed on the navigation tab.

29. The method of claim 17, wherein the first location and the second location are locations of an application of the window.

30. The method of claim 17, wherein the first location is a location of a first application of the window and the second location is a location of a second application of the window.

31. A method for preserving and re-accessing different locations within a window of a windows-based computer environment, said method comprising:
navigating to a first location within the window, wherein the first location has a set of content information that can be presented to the user in a content pane of the window;
creating a first navigation tab of the first location in the content pane of the window, wherein the first navigation tab has a label that reflects the first location;
designating the first location a keep accessible location and causing the label of the first navigation tab to have a keep accessible marker;
navigating to a second location within the window, wherein the second location has a set of content information that can be presented to the user in the content pane of the window;
creating a second navigation tab of the second location in the content pane of the window, wherein the second navigation tab has a label that reflects the second location; and
navigating from the second location back to the first location by selecting the first navigation tab of the first location and accessing the set of content information associated with the first location that was previously displayed in the content pane before navigating to the second location.

32. The method of claim 31, wherein the user designates the first location a keep accessible location.

33. The method of claim 32, wherein the user designates the first location a keep accessible location by selecting a keep accessible menu item.

34. The method of claim 32, wherein the user designates the first location a keep accessible location by selecting a keep accessible tool bar button.

35. The method of claim 31, wherein an application of the window designates the first location a keep accessible location.

36. The method of claim 35, wherein the first location is designated a keep accessible location by setting the first location to a keep accessible state when the first location is initially accessed, thereby causing the first location to be presented to the user when the window is initially opened.

37. The method of claim 35, wherein the first location is designated a keep accessible location because the first navigation tab has a keep accessible default state for the first location, thereby causing the first navigation tab to have a keep accessible state after the user has accessed the first location.

38. The method of claim 31, wherein after creating the second navigation tab, further comprising:
navigating back to the first location of the window by selecting the first navigation tab.

39. The method of claim 38, wherein selecting the first navigation tab causes the first navigation tab to become an active navigation tab of the window and the second navigation tab to become an inactive navigation tab of the window.

40. The method of claim 31, wherein after creating the second navigation tab, further comprising:
designating the second location a keep accessible location and causing the label of the second navigation tab to have a keep accessible marker; and navigating back to the first location of the window by selecting the first navigation tab.

41. The method of claim 40, wherein the user designates the second location a keep accessible location.

42. The method of claim 41, wherein the user designates the second location a keep accessible location by selecting a keep accessible menu item.

43. The method of claim 41, wherein the user designates the second location a keep accessible location by selecting a keep accessible tool bar button.

44. The method of claim 40, wherein an application of the window designates the second location a keep accessible location.

45. The method of claim 44, wherein the second location is designated a keep accessible location by setting the second location to a keep accessible state when the second location is initially accessed, thereby causing the second location to be presented to the user when the window is initially opened.

46. The method of claim 44, wherein the second location is designated a keep accessible location because the active navigation tab has a keep accessible default state for the second location, thereby causing the second navigation tab to have a keep accessible state after the user has accessed the second location.

47. The method of claim 40, wherein selecting the first navigation tab causes the first navigation tab to become an active navigation tab of the window.

48. The method of claim 47, further comprising:

navigating back to the second location of the window by selecting the second navigation tab.

49. The method of claim 31, further comprising:

providing a first status information about the first location within the window to the user.

50. The method of claim 49, wherein the first status information is provided by a first status information marker on the label of the first navigation tab.

51. The method of claim 50, wherein the first status information disappears from the label of the first navigation tab after the user has selected the first navigation tab to view the first location.

52. The method of claim 31, further comprising:

providing a second status information about the second location within the window to the user.

53. The method of claim 52, wherein the second status information is provided by a second status information marker on the label of the second navigation tab.

54. The method of claim 53, wherein the second status information disappears from the label of the second navigation tab after the user has selected the second navigation tab to view the second location.

55. The method of claim 31, wherein the first location and the second location are locations of an application of the window.

56. The method of claim 31, wherein the first location is a location of a first application of the window and the second location is a location of a second application of the window.

57. The method of claim 31, further comprising:

performing a display in new window operation on an active navigation tab of the window;

presenting a view of the location of the active navigation tab in a child window; and causing the active navigation tab of the window to revert to a most recently viewed navigation tab of the window.

58. The method of claim 57, further comprising:

returning the child window to the window by causing the active navigation tab of the window to reflect the location presented in the child window, wherein the active navigation tab has an operation state that the active navigation tab had when the display in view window operation was performed on the navigation tab.

59. A method for preserving and re-accessing different locations within a window of a windows-based computer environment, said method comprising:

navigating to a first location within the window;

creating a first navigation tab of the first location in a content pane of the window, wherein the first navigation tab has a label that reflects the first location;

designating the first location a keep accessible location and causing the label of the first navigation tab to have a keep accessible marker;

navigating to a second location within the window; and creating a second navigation tab of the second location in the content pane of the window, wherein the second navigation tab has a label that reflects the second location, wherein an application of the window designates the first location a keep accessible location and wherein the application of the window designates the first location a keep accessible location if user navigation away from the first location will cause data to be lost or access to status information to become unavailable to the user.

60. A method for preserving and re-accessing different locations within a window of a windows-based computer environment, said method comprising:

navigating to a first location within the window;

creating a first navigation tab of the first location in a content pane of the window, wherein the first navigation tab has a label that reflects the first location;

designating the first location a keep accessible location and causing the label of the first navigation tab to have a keep accessible marker;

navigating to a second location within the window;

creating a second navigation tab of the second location in the content pane of the window, wherein the second navigation tab has a label that reflects the second location;

designating the second location a keep accessible location and causing the label of the second navigation tab to have a keep accessible marker; and navigating back to the first location of the window by selecting the first navigation tab, wherein an application of the window designates the second location a keep accessible location and wherein the application of the window designates the current location a keep accessible location if user navigation away from the current location will cause data to be lost or access to a status information to become unavailable to the user.

61. A computer-readable medium having a computer program for preserving and re-accessing different locations within a window of a windows-based computer environment, said computer program comprising:

instructions for navigating to a first location within the window, wherein the first location has a set of content information that can be presented to the user in the content pane of the window;

instructions for navigating to a second location within the window, wherein the second location has a set of content information that can be presented to the user in the content pane of the window; and instructions for changing a label of a first navigation tab in the content pane of the window to reflect the second location unless the first location has been designated a keep accessible location, in which case a second navigation tab having a label that reflects the second location appears in the content pane of the window and the label of the first navigation tab reflects the first locations, wherein if the first location has been designated a keep accessible location instructions for displaying the set of content information of the first location in the content pane when the user navigates from the second location back to the first location by selecting the first navigation tab of the first location.

62. The medium of claim 61, further comprising:

if the first location has been designated a keep accessible location, instructions for selecting the first navigation tab to navigate to the first location within the window; and if the second location has been designated a keep accessible location, instructions for selecting the second navigation tab to navigate to the second location within the window.

63. The medium of claim 61, further comprising:

instructions for providing a first status information about the first location within the window to the user.

64. The medium of claim 61, further comprising:

instructions for providing a second status information about the second location within the window to the user.

65. The medium of claim 61, wherein the first location and the second location are locations of an application of the window.

66. The medium of claim 61, wherein the first location is a location of a first application of the window and the second location is a location of a second application of the window.

67. The medium of claim 61, further comprising:

instructions for performing a display in new window operation on an active navigation tab of the window;

instructions for presenting a view of the location of the active navigation tab in a child window; and instructions for causing the active navigation tab of the window to revert to a most recently viewed navigation tab of the window.

68. The medium of claim 67, further comprising:

instructions for returning the child window to the window that cause the active navigation tab of the window to reflect the location presented in the child window, wherein the active navigation tab has an operation state that the active navigation tab had when the display in view window operation was performed on the navigation tab.

69. A computer-readable medium having a computer program for preserving and re-accessing different locations within a window of a windows-based computer environment, said computer program comprising:

instructions for navigating to a first location within the window, wherein the first location has a set of content information that can be presented to the user in a content pane of the window;

instructions for creating a first navigation tab of the first location in the content pane of the window, wherein the first navigation tab has a label that reflects the first location;

instructions for designating the first location a keep accessible location and causing the label of the first navigation tab to have a keep accessible marker;

instructions for navigating to a second location within the window, wherein the second location has a set of content information that can be presented to the user in the content pane of the window;

instructions for creating a second navigation tab of the second location in the content pane of the window, wherein the second navigation tab has a label that reflects the second location, and instructions for displaying the set of content information associated with the first location in the content sane when the user navigates from the second location back to the first location by selecting the first navigation tab of the first location.

70. The medium of claim 69, wherein designating the first location a keep accessible location comprises instructions for setting the first location to a keep accessible state when the first location is initially accessed, thereby causing the first location to be presented to the user when the window is initially opened.

71. The medium of claim 69, wherein designating the first location a keep accessible location comprises instructions for setting the first navigation tab to a keep accessible default state for the first location, thereby causing the first navigation tab to have a keep accessible state after the user has accessed the first location.

72. The medium of claim 69, wherein after creating the second navigation tab, further comprising:

instructions for navigating back to the first location of the window after the user selects the first navigation tab.

73. The medium of claim 69, wherein after creating the second navigation tab, further comprising:

instructions for designating the second location a keep accessible location and causing the label of the second navigation tab to have a keep accessible marker; and instructions for navigating back to the first location of the window by selecting the first navigation tab.

74. The medium of claim 69, further comprising:

instructions for providing a first status information about the first location within the window to the user.

75. The medium of claim 69, further comprising:

instructions for providing a second status information about the second location within the window to the user.

76. The medium of claim 69, wherein the first location and the second location are locations of an application of the window.

77. The medium of claim 69, wherein the first location is a location of a first application of the window and the second location is a location of a second application of the window.

78. The medium of claim 69, further comprising:

instructions for performing a display in new window operation on an active navigation tab of the window;

instructions for presenting a view of the location of the active navigation tab in a child window; and instructions for causing the active navigation tab of the window to revert to a most recently viewed navigation tab of the window.

79. The method of claim 78, further comprising:

instructions for returning the child window to the window that cause the active navigation tab of the window to reflect the location presented in the child window, wherein the active navigation tab has an operation state that the active navigation tab had when the display in view window operation was performed on the navigation tab.

80. A computer-readable medium having a computer program for preserving and re-accessing different locations within a window of a windows-based computer environment, said computer program comprising:

instructions for navigating to a first location within the window;

instructions for creating a first navigation tab of the first location in a content pane of the window, wherein the first navigation tab has a label that reflects the first location;

instructions for designating the first location a keep accessible location and causing the label of the first navigation tab to have a keep accessible marker;

instructions for navigating to a second location within the window; and instructions for creating a second navigation tab of the second location in the content pane of the window, wherein the second navigation tab has a label that reflects the second location, wherein the first location is designated a keep accessible location if user navigation away from the first location will cause data to be lost or access to a status information to become unavailable to the user.

* * * * *

UNITED STATES PATENT AND TRADEMARK OFFICE
CERTIFICATE OF CORRECTION

PATENT NO.     : 6,043,816
DATED          : March 28, 2000
INVENTOR(S)    : Evelyn L. Williams et al Page 1 of 1

It is certified that error appears in the above-identified patent and that said Letters Patent is hereby corrected as shown below:

<u>Column 9,</u>
Line 9, delete "on be" and insert therefor -- can be --

<u>Column 10,</u>
Line 49, delete "keel" and insert therefor -- keep --

<u>Column 15,</u>
Line 8, delete "locations" and insert therefor -- location --

<u>Column 16,</u>
Line 11, delete "sane" and insert therefor -- pane --

Signed and Sealed this

Fourth Day of June, 2002

*Attest:*

*Attesting Officer*

JAMES E. ROGAN
*Director of the United States Patent and Trademark Office*